United States Patent [19]
Simard

[11] Patent Number: 5,927,049
[45] Date of Patent: Jul. 27, 1999

[54] YELLOW PINE WOOD ANIMAL LITTER METHOD OF MANUFACTURE

[75] Inventor: Kenyon Allen Simard, Wellintong, Fla.

[73] Assignee: Nature's Earth Products Inc., Fla.

[21] Appl. No.: 08/956,560

[22] Filed: Oct. 23, 1997

[51] Int. Cl.$^6$ ..................................................... B65B 63/00
[52] U.S. Cl. ................................ 53/428; 53/440; 100/39; 100/903; 119/171; 241/28
[58] Field of Search .............................. 53/428, 435, 438, 53/440; 100/39, 96, 903, 904, 905, 906, 907, 908; 119/171, 172, 173; 241/23, 28

[56] References Cited

U.S. PATENT DOCUMENTS

| | | |
|---|---|---|
| 3,941,090 | 3/1976 | Fry . |
| 4,258,659 | 3/1981 | Rowell . |
| 4,305,345 | 12/1981 | Otoguro . |
| 4,560,527 | 12/1985 | Harke et al. . |
| 4,788,936 | 12/1988 | Billings . |
| 4,794,022 | 12/1988 | Johnson et al. . |
| 5,044,324 | 9/1991 | Morgan et al. . |
| 5,195,465 | 3/1993 | Webb et al. . |
| 5,271,355 | 12/1993 | Bilings . |

*Primary Examiner*—Daniel B. Moon
*Attorney, Agent, or Firm*—McHale & Slavin

[57] ABSTRACT

A method for processing yellow pine wood products into pellets for use as animal litter. The process includes the steps of collecting and drying yellow pine material and drying the wood material into a grist. The grist is moisturized by exposure to steam before placement into a pellet forming device that applies heat and pressure to the grist. The formed pellets are deposited into bags and sealed for shipment. The pellets are used as animal litter that is highly absorbent, biodegradable, odor controlling, dustless, and will remain smooth and non-fur-engaging through continued handling.

2 Claims, 1 Drawing Sheet

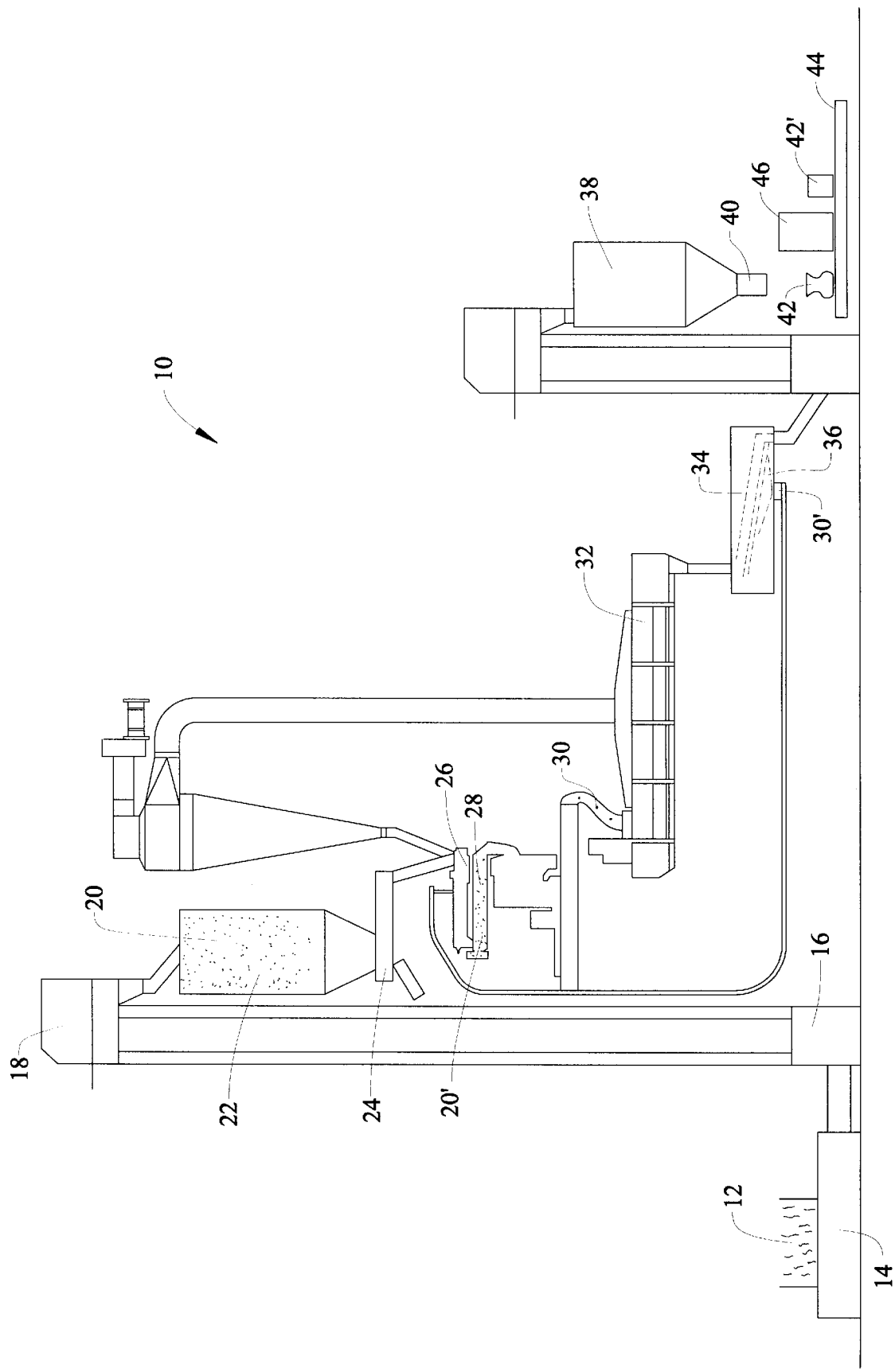

YELLOW PINE WOOD ANIMAL LITTER METHOD OF MANUFACTURE

FIELD OF THE INVENTION

The present invention relates to animal litter and particularly to pelletized litter and process of manufacturing a yellow pine wood litter that is highly absorbent, biodegradable, odor controlling, dustless, and will remain intact through usage.

BACKGROUND OF THE INVENTION

Pet owners have an ongoing need to dispose of pet waste. For this reason, there are numerous methods of catching or holding pet waste until disposal. The waste material employed is commonly placed in a box and generally referred to as a litterbox. The litterbox may be placed beneath birds, gerbils, rabbits and so forth. The litter being cleaned or replaced on a periodic basis.

Many types of litter exist. Some litters are simply sand, and/or gravel mixtures. This type of litter is relatively inexpensive but not entirely absorbent. Furthermore, without chemical additives, this type of litter does not control waste odors effectively.

One of the most popular litters is clay-based. When these litters include hydrophilic additives, they are often referred to as "scoopable" litters. Scoopable litters bond with waste and produce clumps that may be separated easily from non-soiled litter and removed. Although this type of litter is absorbent, the clay does not readily break down and may clog sewage pipes if flushed through toilets after use.

Other known litters are formed from fibrous organic by-products. Corn husks, peanut hulls, and sugar cane, for example, may all be used as animal litter. Litter made from these materials is biodegradable and absorbent. Unfortunately, without chemical additives, this type of litter typically does not effectively control waste odors. The inclusion of chemical additives for odor control often results in a litter that is objectionable to pets. Because pets have keen senses, objectionable litter may not be used by the pet.

Still other litters are formed from wood materials. U.S. Pat. No. 4,258,659 discloses a method for collecting wood particles of a desired size and their subsequent use as animal litter. This patent is directed to a process for drying and sorting wood materials by size. Particles of a desired size are then bagged and shipped. However, while the '659 litter is biodegradable and absorbent, the unprocessed nature of this litter results in litter particles that can create potentially-harmful dust. During handling, especially shipping and "scooping", this type of litter will produce airborne particles that can be harmful to pets as well as other occupants of a residence if inhaled.

U.S. Pat. No. 5,044,324 disclosed yet another wood-based animal litter combining several types of wood into admixed grists that are processed into irregularly-shaped "crumbles." The '324 patent is directed at combining wood types to create litters that have desired nitrogen contents, display insect repelling tendencies, or exhibit antimicrobial properties. However, this litter may further crumble in an undesired manner and requires two or more wood types for creation. Unwanted litter crumbling may create burr-like projections, resulting in litter that will stick to animal fur and be tracked away from the litterbox.

Thus, what is lacking in this art is an inexpensive litter and method of manufacture that combines the advantages of the highly absorbent and biodegradable litter into a litter that will remain smooth and non-fur-engaging through continued handling. The litter should not crumble or produce dust after long periods of storage or rough treatment. The litter should also effectively control waste odors.

SUMMARY OF THE INVENTION

The present invention is directed to a yellow pine wood litter and process of manufacturing the litter. The litter is highly absorbent, biodegradable, odor controlling, dustless, and will remain smooth and non-fur-engaging through continued handling. The litter is formed from a particular type of yellow pine wood material which is dried and cured in a kiln for a period of two weeks.

The dried material is then ground by use of a hammer mill to form a grist of uniform consistency. The grist is then placed in a conditioning chamber and steamed before placement in a pellet mill. The pellet mill forms the grist into pellets by use of high pressures at an elevated temperature. The pellets are then cooled to an ambient temperature and placed in a screened shaker for uniform pellet collection. The pellets are then placed into shipping or storage bags, typically polyethylene or the like lined bag to prevent absorption of moisture.

The pellets maintain their natural scent. However, the uniform size of the pellets is such that adherence to animal hair is eliminated and pressure sealed to prevent degradation which typically leads to dust formation. In addition, the porosity of the material provides superior absorbance and ease of detecting spoiled litter for removal. The wood pellets, having no artificial additives, are biodegradable upon disposal.

Accordingly, it is an object of the present invention to teach animal litter pellets that are highly absorbent and effective at controlling pet waste odors.

It is a further object of the present invention to teach animal litter pellets that have enhanced dust-reducing qualities.

It is an additional object of the present invention to teach animal litter pellets that do not crumble with repeated handling or during periods of extended storage.

It is still a further object of the present invention to teach animal litter pellets that have improved non-cling properties.

It is yet another object of the present invention to teach animal litter pellets that are biodegradable and available at a low cost.

Other objects and advantages of this invention will become apparent from the following description taken in conjunction with the accompanying drawings wherein are set forth, by way of illustration and example, certain embodiments of this invention. The drawing constitutes a part of this specification and includes exemplary embodiments of the present invention and illustrates various objects and features thereof.

BRIEF DESCRIPTION OF THE DRAWING

FIG. 1 is a schematic representation of a method for producing animal litter according to the present invention.

DETAILED DESCRIPTION OF THE INVENTION

Now with reference to FIG. 1, a schematic view 10 of a method of making yellow pine wood fiber pellets for use as animal litter is shown. A preferred grade of yellow pine wood 12 is delivered to a receiving depot 14 where it is off-loaded and placed into a kiln 16. Once in the kiln 16, the wood material is subjected to a temperature of about 120° F. to 140° F., at low consistent humidity, for a period of approximately two weeks. The kiln causes the wood to reach a uniform moisture content.

After the material 12 has been cured, the material is transferred to a hammer mill 18 and ground into a grist 20. The grist 20 is collected in a first surge chamber 22. The initial curing results in dimensional variances, produced by shrinkage during drying, and are eradicated during the grinding process. This results in a grist 20 that is uniform, evenly compressible, and conducive to holding a fixed shape. Additionally, the uniform nature of the grist 20 ensures that litter made therefrom will have no jagged, fur-engaging projections.

The grist 20 is stored in the first surge chamber 22, until it is transferred via a transfer feeder 24 to a conditioning chamber 26. While in the conditioning chamber 26, the grist 20 is exposed to steam having a temperature ranging from 120° F. to 140° F. for approximately 30–40 seconds to form a grist having a uniform moisture content.

After being exposed to the steam, the moistened grist 20' flows into a pellet mill 28, where the moistened grist is processed into a uniform pellet 30. During the pelletization process, the moistened grist 20' is exposed to increased temperature and pressure for a short period of time. More specifically, the moistened grist 20' is heated to a temperature in the range of 200° F. to 250° F., at a pressure of approximately 60 Kpsi for approximately 8 to 10 seconds.

The pellets are then transferred to a cooler 32 where the pellet temperature drops to ambient temperature. This cooling step advantageously allows the pellets to coalesce before further processing. This helps create sturdy pellets 30 that will not crumble during shipment, storage, or subsequent handling.

Once the pellets 30 have cooled, the pellets pass through a shaker 34 having a sifting screen 36 which removes any materials that did not form into a proper pellet. As the pellets move across the sifting screen 36, fine particles 30' are separated from the pellets 30 which are returned to the feeder 24 and mixed with grist 20 exiting from the first surge chamber 22. In this way, the returned fine particles 30' are combined with fresh grist 20 to form additional pellets 30.

Pellets 30 exiting the shaker construction 34 are collected in a second surge chamber 40, in preparation for bagging. From the second surge chamber 40, pellets 30 are released into a bagger unit 40, where the pellets are deposited in bags 42. The bags 42 travel on a bag conveyor 44 through a heat sealer 46 that closes the bags. The sealed bags 42' are then transported to remote locations for sale and use as animal litter.

Because the pellets 30 are created from a particular grade of yellow pine wood, they have increased non-cling properties. Yellow pine is relatively soft and allows formation into a smooth finish. The smooth finish is maintained even through excessive handling or rough treatment.

Additionally, because yellow pine is a wood with very low resin content, it creates very stable pellets. That is, there is very little extra drying or unwanted shrinkage over time. This low-shrinkage tendency means that the pellets of the present invention will endure long periods of storage without cracking. As a result, the pellets produce hardly any dust and do not crumble with age.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and described in the specification.

What is claimed is:

1. A method of making wood fiber pellets for animal litter, comprising the steps of:

(a) drying yellow pine wood material at temperature in the range between 120° F. to 140° F. for a time period of approximately two weeks;

(b) grinding said dried material by use of a hammer mill to form a grist;

(c) exposing said grist to steam having a temperature in the range between 120° F. to 140° F. for a time period of approximately thirty and forty seconds;

(d) forming said grist into smooth uniform shaped pellets by exposing said conditioned grist at a predetermined pressure of about 60 Kpsi at a temperature between 200° F. to 250° F. for approximately eight to ten seconds;

(e) cooling said pellets to an ambient temperature;

(f) dividing said pellets into a first group and a second group, said first group containing said pellets of preferred dimensions and said second group containing said pellets of non-preferred dimensions; and (g) packaging said first group of said pellets for storage and distribution.

2. The method of making wood fiber pellets for animal litter of claim 1 including the step of:

(h) returning said second group of said pellets to step (c).

\* \* \* \* \*